H. WILSON & O. R. OEHMLER.
SHIP'S TELEGRAPH RECORDER.
APPLICATION FILED OCT. 22, 1908. RENEWED AUG. 13, 1910.
991,585.
Patented May 9, 1911.
5 SHEETS—SHEET 1.
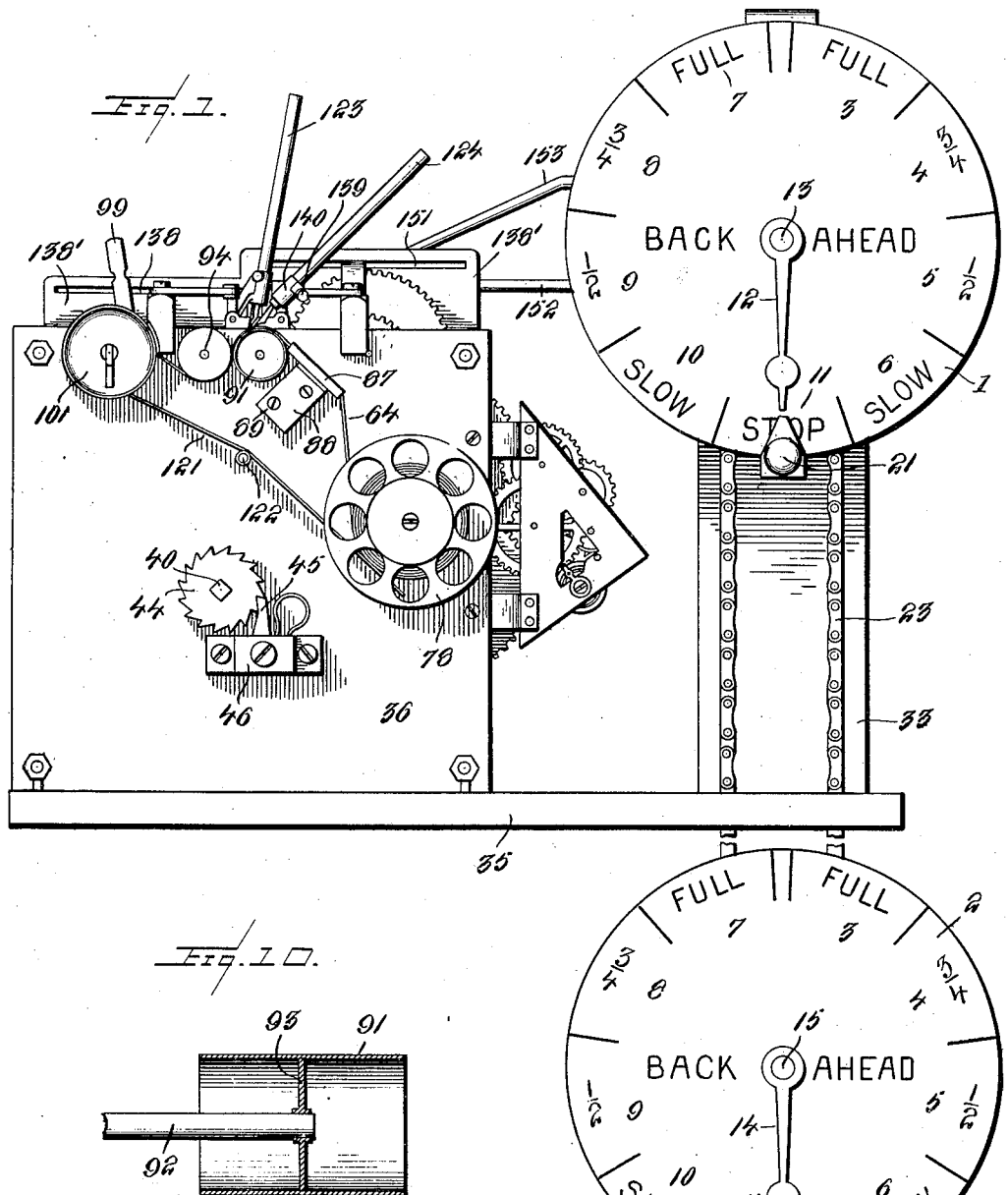
WITNESSES:
INVENTORS
Harry Wilson
and Oscar R. Oehmler,
BY
Attorneys

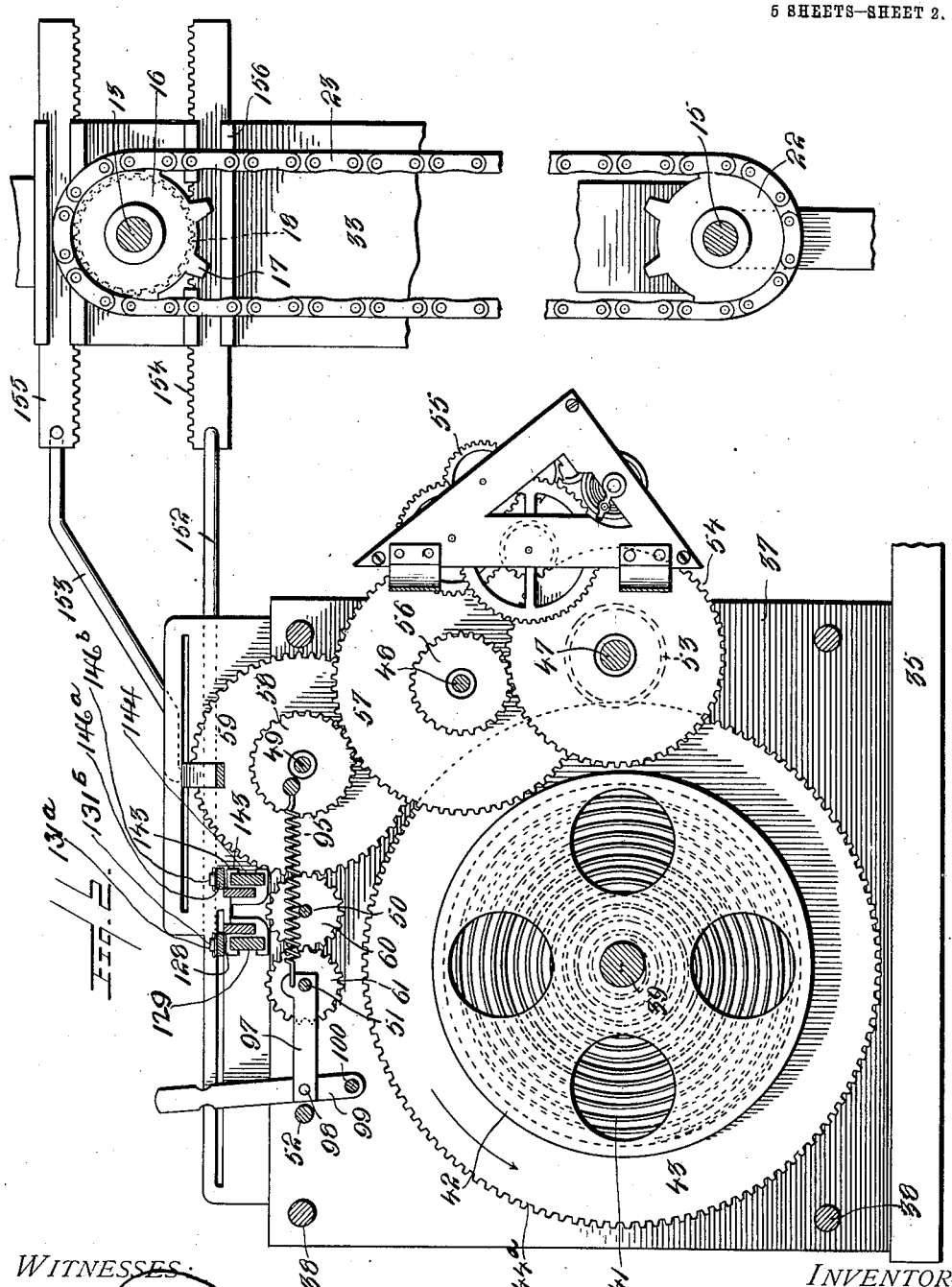

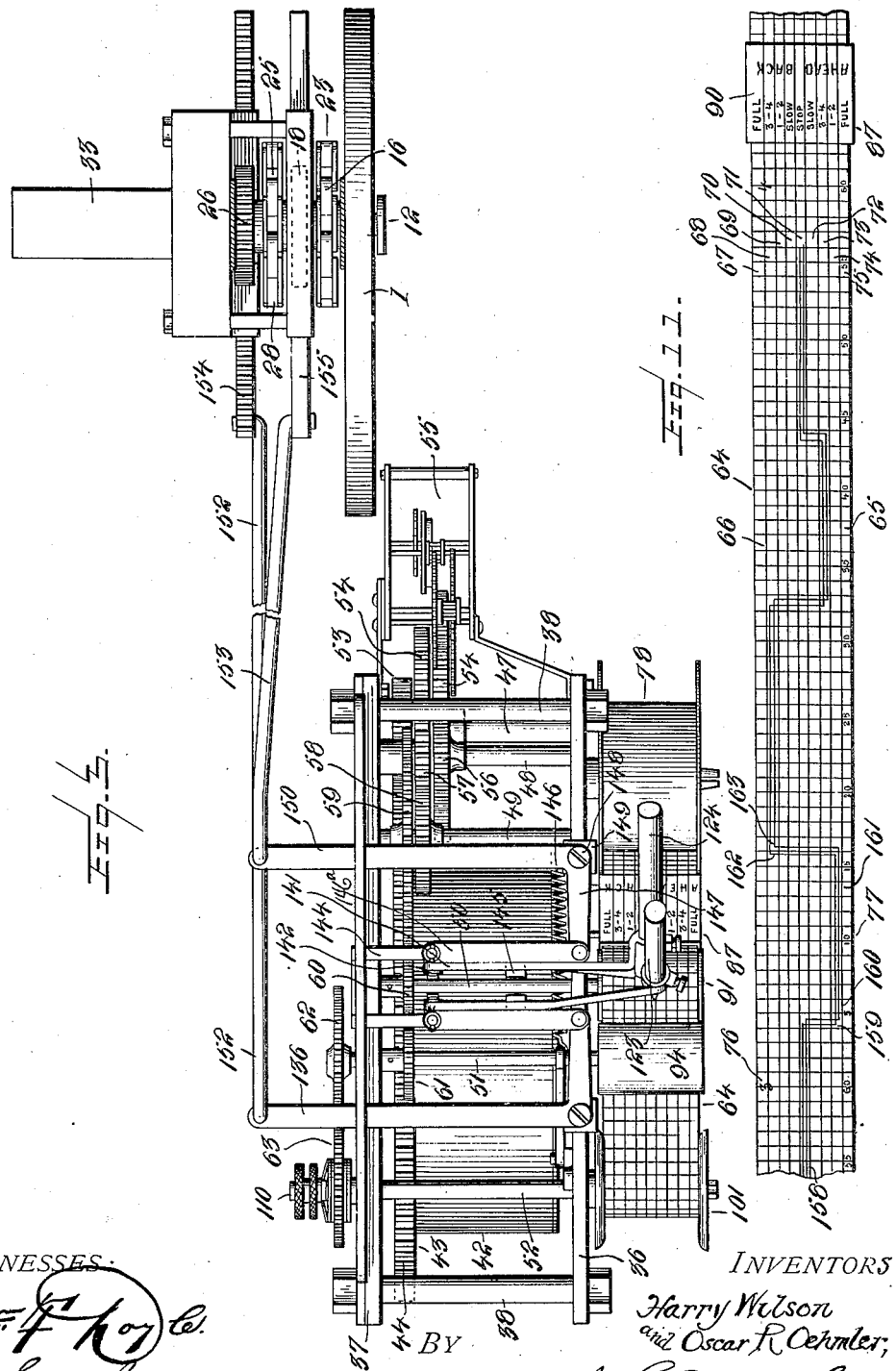

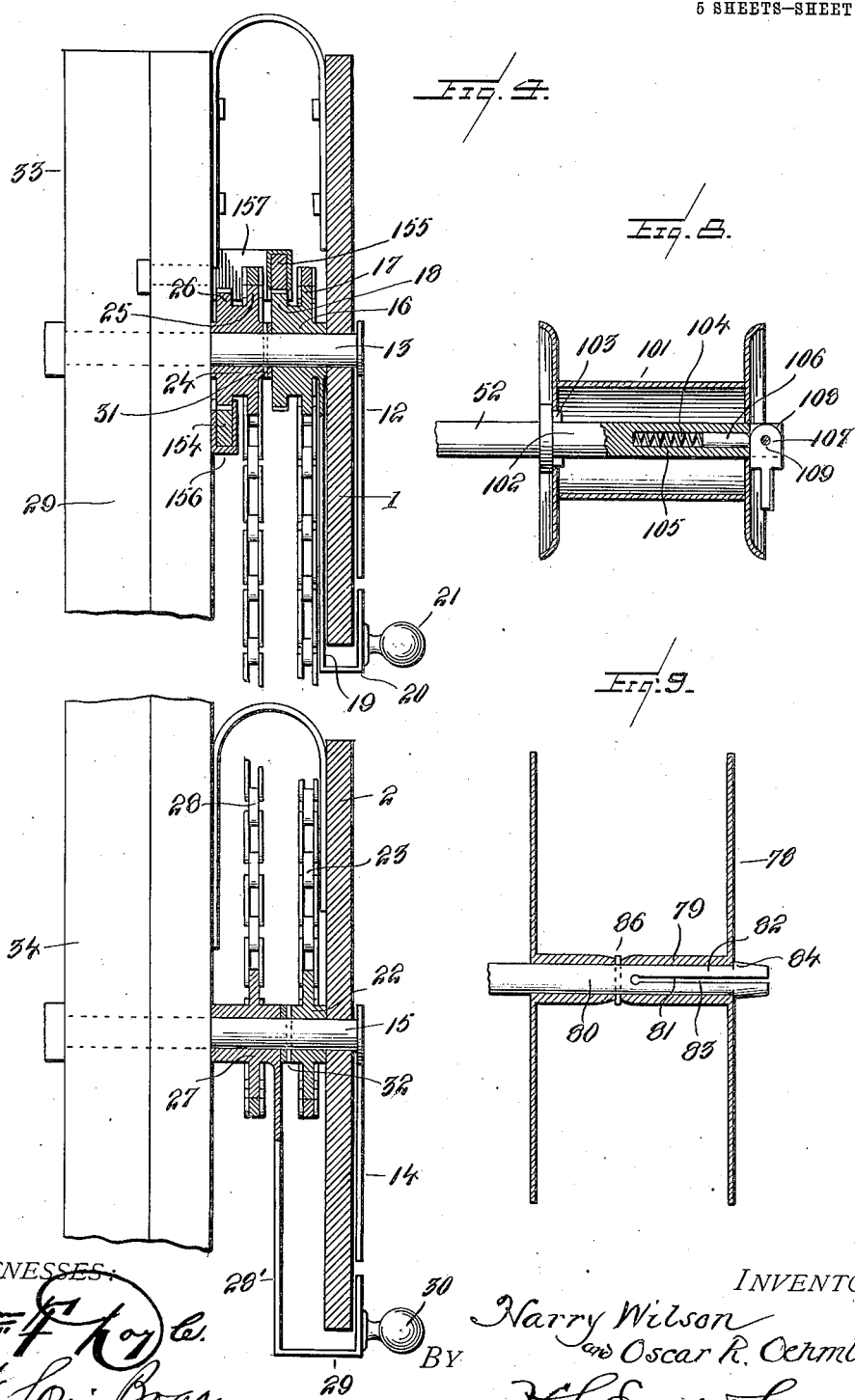

H. WILSON & O. R. OEHMLER.
SHIP'S TELEGRAPH RECORDER.
APPLICATION FILED OCT. 22, 1908. RENEWED AUG. 13, 1910.
991,585.
Patented May 9, 1911.
5 SHEETS—SHEET 5.
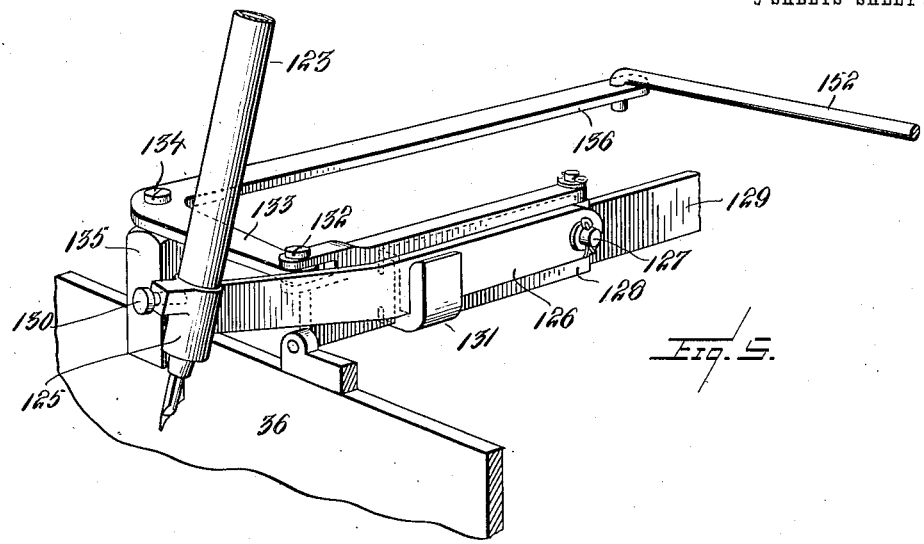
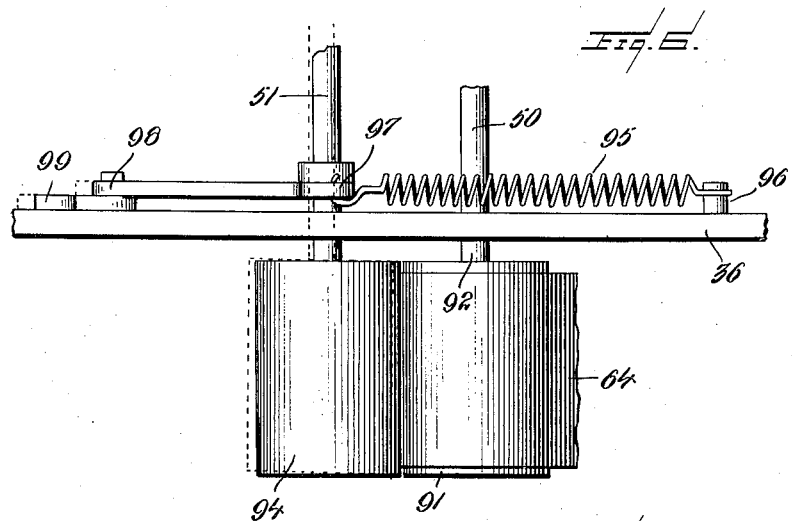
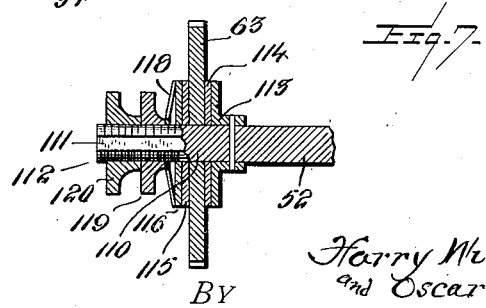
WITNESSES:
INVENTORS
Harry Wilson
and Oscar R. Oehmler
BY
Attorneys

UNITED STATES PATENT OFFICE.

HARRY WILSON AND OSCAR R. OEHMLER, OF WASHINGTON, DISTRICT OF COLUMBIA, ASSIGNORS OF ONE-THIRD TO EDWARD A. HENKLE, OF PHILADELPHIA, PENNSYLVANIA.

SHIP'S-TELEGRAPH RECORDER.

991,585.        Specification of Letters Patent.        Patented May 9, 1911.

Application filed October 22, 1908, Serial No. 458,979. Renewed August 13, 1910. Serial No. 577,087.

*To all whom it may concern:*

Be it known that we, HARRY WILSON and OSCAR R. OEHMLER, citizens of the United States of America, residing at Washington, in the District of Columbia, have invented certain new and useful Improvements in Ships'-Telegraph Recorders, of which the following is a specification, reference being had therein to the accompanying drawing.

This invention relates to ships' telegraph recorders and the object thereof is to provide means for making a visible record of an order from an officer of a vessel to an engineer and for making a visible record of the response by the engineer to indicate to the officer the receipt of the order by the engineer.

Furthermore the invention aims to provide means whereby a complete and permanent record will be made of all orders given by an officer to an engineer during the maneuvering of a vessel so as to accurately set forth the time of the receipt of the orders by the engineer and whether said orders have been correctly carried out at the proper time and which will cause the engineer to be unusually careful so that he will correctly carry out at the proper time the orders given thereby overcoming any liability of accident and which will also settle disputes as to the orders given and received.

Further objects of the invention are to provide a ship's telegraph recorder which shall be simple in its construction, strong, durable, efficient in its use, accurate in its records, conveniently disposed and attached to the ship's telegraph and inexpensive to manufacture.

With the foregoing and other objects in view, the invention consists of the novel construction, combination and arrangement of parts hereinafter referred to and illustrated in the accompanying drawings wherein is shown by way of example, a ship's telegraph recorder in accordance with this invention, but it will furthermore be understood that changes, variations and modifications can be resorted to, which come within the scope of the claims hereunto appended.

In describing the invention in detail, reference is had to the accompanying drawings wherein like characters of reference denote corresponding parts throughout the several views, and in which, Figure 1 is a side elevation of a recorder in accordance with this invention showing the adaptation thereof in connection with a ship's telegraph. Fig. 2 is a longitudinal sectional view of the recorder also showing a portion of a ship's telegraph to which the recorder is operatively connected. Fig. 3 is a top plan of the recorder showing the same connected with the ship's telegraph. Fig. 4 is a vertical sectional view of a ship's telegraph showing the operative connection between it and the recorder in section. Fig. 5 is a detail in perspective showing one of the operating means for one of the markers. Fig. 6 is a detail in plan of the record tape feed cylinder and also the friction roll. Fig. 7 is a sectional detail showing the friction clutch for the shaft of the tape receiving spool. Fig. 8 is a detail in longitudinal section of the tape receiving spool. Fig. 9 is a like view of the tape reel. Fig. 10 is a detail in longitudinal section of the tape feed cylinder, and, Fig. 11 is a face view showing a portion of a record tape with the record thereon.

Referring to the drawings in detail, 1 denotes a navigating officer's dial and 2 an engineer's dial. The dials are provided with corresponding indications, the indications upon one-half of each dial being for orders given for "Ahead" as at 3, 4, 5, and 6, the other half of each of the dials is provided with a series of inscriptions for orders "Astern" or "Back" as at 7, 8, 9 and 10. Each of the dials is provided with an inscription as at 11 to indicate "Stop." With the dial 1 there is associated a pointer 12 mounted upon a shaft 13 and upon the dial 2 there is associated a pointer 14 mounted upon a shaft 15. Loosely mounted upon the shaft 13 is a double sprocket wheel 16, one set of teeth of the said wheel being indicated by the reference character 17 and the other set by the reference character 18. Depending from the sprocket wheel 16 at the rear of the dial 1 is an arm 19 provided with an angular end 20 which overlaps the front of the dial 1 and carries a handle 21. Fixed to the shaft 15 is a sprocket wheel 22 and engaging with the teeth 17 of the sprocket wheel 16 and the teeth of the sprocket wheel 22 is a sprocket chain 23. Fixed to the shaft 13 is a double sprocket wheel 24, one set of teeth being indicated by the reference character 25 and the other set by the reference character 26. Loosely mounted on the shaft 15 is a sprocket wheel 27 and engaging with the teeth of the sprocket wheel 27 and the teeth 25 of the sprocket wheel 24 is a sprocket chain 28. Connected with the sprocket wheel 27 is an arm 28' which is arranged at the rear of the dial 2 and has an angular lower portion 29 which straddles the dial and which carries a handle 30. The wheel 24 is keyed to the shaft 13 as at 31 and the wheel 22 is keyed to the shaft as at 32. The dial 1 by way of example, is placed in the pilot house, or the dial can be at any desired point upon the vessel. The dial 2 is placed in the engine room. The shaft 13 is journaled in a suitable support 33 and the shaft 15 in a suitable support 34.

By the foregoing construction and arrangement of parts, it is evident that if the handle 21 be shifted the pointer 14 will also be shifted, this action is had owing to the fact that the sprocket wheel 16 is loose on the shaft 13 while the sprocket wheel 22 is fixed to the shaft 15, as the latter carries the pointer 14, it is evident that when the handle 21 is shifted to indicate an order that the pointer 14 will also be shifted to indicate to the engineer the order. The engineer answers by shifting the handle 30, if the latter is shifted, it is evident that the pointer 12 of the dial 1 will be shifted as the sprocket wheel 24 is fixed to the shaft 13 while the sprocket wheel 27 is loose upon the shaft. The foregoing construction with the exception of providing the duplex sprocket wheels 16 and 24 is the well known form of ship's telegraph. In a ship's telegraph of a mechanical character, single sprocket wheels are used in lieu of the duplex sprocket wheels 16 and 24. These duplex sprocket wheels are provided so as to operatively connect a recorder in accordance with this invention to a ship's telegraph whereby on the operation of the telegraph by the navigating officer a record of his order will be made and on the operating of the telegraph by the engineer when answering the navigating officer's order, a record of the engineer's answer will be made. The operative connection between the ship's telegraph and the recorder in accordance with this invention will be hereinafter more specifically referred to.

A recorder in accordance with this invention which is adapted to associate with the ship's telegraph comprises a base 35 to which is attached a pair of vertically extending supporting plates 36, 37 connected together and braced by the tie-bars 38. Journaled in the plates 36, 37, is a winding shaft 39 having one end projecting from the plate 36 and squared as at 40 to receive a suitable key or implement for rotating the shaft to wind a power transmitting spring 41, the said spring 41 having one end connected to the shaft 39 and its other end to a barrel 42, the latter inclosing the spring and provided with a laterally extending annular flange 43 having its periphery toothed as at 44ª. The projecting end of the shaft 39 carries a ratchet wheel 44 which is engaged by a spring pressed stop pawl 45 secured to the outer face of the plate 36 by the keeper 46. The spring 41, barrel 42 and toothed flange 43 constitute elements of a spring motor mechanism, the remaining elements of said mechanism comprising the driven shafts 47, 48, 49, 50, 51 and 52. Upon the shaft 47 is arranged a pinion 53 which meshes with the teeth 44 and upon the shaft 47 is also arranged a gear wheel 54 which meshes with a clock train 55 constituting a speed regulator or in other words regulating the speed of the elements driven by the motor mechanism so that said elements will operate at a pre-determined speed. The gear wheel 54 meshes with the pinion 56 carried by the shaft 48. The shaft 48 also carries a gear 57 which meshes with a pinion 58 on the shaft 49. The shaft 49 also carries a gear 59 which meshes with a small gear 60 upon the shaft 50. The gear 60 meshes with the gear 61 upon the shaft 51. The latter at one end projects from the plate 37 and on said projecting end carries a gear wheel 62 which meshes with the gear wheel 63 carried on one end of the shaft 52 which projects from the plate 37.

A recorder in accordance with this invention embodies means upon which a permanent record is made of the order and the answer to the order, said means being so set up as to indicate the time of the receipt of the order, as well as the time in responding to the order and also any period of time which may elapse between the receipt of the order and the response thereto. Furthermore the said means will also indicate a wrong response to an order. By way of example, the said means as clearly shown in Fig. 11 is illustrated as a record tape and indicated by the reference character 64 and the said tape is divided by longitudinally extending and transversely extending lines 65, 66, respectively, which divides the tape into longitudinally extending spaces and transversely extending spaces, the longitudinally extending spaces indicating the order and the transversely extending spaces time. Each of the transversely extending spaces indicates a minute.

The longitudinally extending spaces are indicated by the reference characters 67, 68, 69, 70, 71, 72, 73, 74, and 75. The space 67 is adapted to indicate an order "Full speed astern," the space 68, "¾ speed astern", the space 69, "½ speed astern", the space 70, "Slow speed astern", the space 71, "Stop", the space 72, "Slow speed ahead", the space 73 "½ speed ahead", the space 74 "¾ speed ahead" and the space 75 "Full speed ahead". The longitudinally extending indicating spaces of the record tape 64 associate with the indications upon the dials 1, 2. The length of the tape is such as to provide a record for 24 hours and it is provided with indications as at 76, 77, to indicate the hour and the minutes past the hour. The tape when positioned upon the recorder is in the form of a roll and is mounted upon a reel 78 arranged forwardly of the plate 36. The reel is formed with a hollow hub 79 for positioning upon the spindle 80, the latter is split as at 81 to provide a pair of spring arms 82, 83, which are shouldered as at 84. The hub 79 of the reel 78 is formed in two sections, the said sections being separated by a pin 86, the latter retains the inner section of the hub and upon the spindle 80 while the outer section of the hub is removable to allow of the positioning of a roll of tape. This provision can be had by compressing the arms 82, 83 together which allows the outer section of the hub to clear the shoulders 84 of the arms 82, 83. The shoulders 84 of the said spring arms constitute means for retaining the outer section of the hub upon the spindle 80.

Secured to the front face of the plate 36 and at an inclination is a laterally extending hollow tape guide 87 having an off-set portion 88 through which extends hold fast devices 89 for securing the guide 87 in position. The guide 87 is of a width sufficient for the passage of the tape 64 and has its upper face provided with a series of indications as at 90 which correspond to the inscriptions upon the dials 1 and 2. The guide 87 is arranged in close proximity to the tape feeding cylinder 91, the latter being connected with the outer terminus of the projecting portion 92 of the shaft 50, the said portion 92 of the shaft 50 projecting outwardly from the plate 36. The connection between the cylinder 91 and the outer terminus of the portion 92 is had through the medium of a resilient diaphram 93 which is formed integral with the inner face of the cylinder 91 and also formed integral with the outer terminus of the portion 92. By such an arrangement the cylinder 91 can shift to provide for any inequalities or irregularities during the feeding of the tape by the said cylinder. The shaft 51 projects from the plate 36 and is arranged in parallelism with respect to the shaft 50 and the said projecting end of the shaft 51 carries a friction roll 94 which is arranged in close proximity to the cylinder 91 whereby the tape 64 will be caused to frictionally engage the cylinder 91 as the tape travels over the said cylinder. The friction roll 94 is shiftable away from the cylinder 91 to allow of the positioning of the tape between the roll 94 and the cylinder 91 when arranging a new roll of tape upon the machine. The roll 91 is normally retained in close proximity to the cylinder 91 through the medium of a pulling spring 95, the latter being positioned at the rear of the plate 36 and having one end connected to an inwardly extending stud 96 and its other end attached to a link 97 which is fixed to the shaft 51. The opening in the plate 36 through which extends the shaft 51 is of such diameter as to allow of that end of the shaft 51 which carries the friction roll 94 to be shifted in a longitudinal direction, either from or toward the cylinder 91. The link 97 is pivoted as at 98 to a vertically extending lever 99 which is arranged at the rear of the plate 36 and pivoted thereto as at 100, the lever 99 projects above the plate 36 so that access can be had thereto when occasion so requires. Arranged in suitable relation with respect to the friction roll 94 is a tape receiving spool 101, the function of which is to receive the tape after the record has been made thereon. The shaft 52 projects outwardly from the plate 36, the said projecting portion being indicated by the reference character 102 and upon the said projecting portion 102 of the shaft 52 is removably secured the spool 101. The spool 101 turns with the shaft 52 and is feathered thereon as at 103. The projecting end 102 of the shaft 52 is provided with a socket 104 in which is arranged a coil spring 105 against which bears a frictional locking pin 106 having a pivoted retaining arm 107. The outer terminus of the projecting portion 102 of the shaft 52 is bifurcated as at 108 and in the said bifrucated terminus is pivoted as at 109 the arm 107. When the arm 107 is shifted to extend in a longitudinal direction with respect to the shaft 102, the spool 101 can be removed from the projecting portion 102 of the shaft 52, but when the arm 107 is positioned at right angles with respect to the shaft 52 the spool 101 is retained upon the shaft. The function of the pin 106 is to retain the arm 107 in a position at right angles to the shaft 52 during the rotation of the shaft and by such an arrangement the spool 101 is maintained in position. The pin 106 bears against the inner edge of the arm 107 through the medium of the spring 104 and by such an arrangement the arm 107 is retained in its angular position. The shaft 52 projects rearwardly of the plate 37, said projecting end being indicated by the reference character 110 and upon said projecting end 110 is frictionally secured the gear wheel 63. The projecting end 110 is provided with a mutilated thread or in other words opposite sides of the said projecting end are flat as at 111 and threaded as at 112, while the other sides are provided with threads. Carried by the shaft 52 is a fixed carrier 113 against which is positioned a washer 114, the latter bearing against one face of the gear wheel 63. Bearing against the other face of the gear wheel is a flexible washer 115, abutting against said washer is a metallic disk 116 and bearing against the disk 116 is a spring clamping plate 118. The washer 115, disk 116 and clamping plate 118 have squared openings so that these elements will turn with the shaft 52. Abutting against the spring clamping plate 118 is a binding nut 119 and abutting against the binding nut 119 is a lock nut 120. The gear wheel 63 is frictionally coupled with the shaft 52 by the elements 113 to 120 respectively. By such an arrangement however, it is evident that the shaft 52 can be turned independently of its operation by the gear wheel 63, such provision is necessary as it is sometimes desirable to wind the tape upon the spool 101 independently of the driving of the shaft 52 through the medium of the gear wheel 63. To prevent the tape from dropping down as it is being unwound from the reel 78 and to also hold the tape as it is being wound upon the spool 101, a spring holding member 121 is provided which is pivoted upon a stud 122 projecting from the plate 36 and which is of a length as to extend against the tape upon the reel 78 and against the tape upon the spool 101.

From the foregoing arrangement of parts, it is evident that when the motor mechanism is operating, the shaft 47 will be rotated owing to the meshing of the pinion 53 with the toothed edge 44ª of the flange 43 of the spring barrel 42, but that the operation of the shaft 47 will be retarded or governed by the clock train 55 whereby the said shaft 47 will rotate at a predetermined speed. As the gear wheel 54 is carried with and rotated by the shaft 47, motion will be transmitted to the shaft 48 owing to the meshing of the gear 54 with the pinion 56. Motion will also be transmitted to the shaft 49 owing to the fact that the gear wheel 57 carried by the shaft 48 meshes with the pinion 58 upon the shaft 49. As the gear wheel 59 is carried with and rotated by the shaft 49, it is evident that motion will be transmitted to the shaft 50 owing to the meshing of the gear 60 with the gear 59, the operation of the shaft 60 rotating the tape feed cylinder 91. As the gear 60 upon the shaft 50 meshes with the gear 61 upon the shaft 51, the latter will be rotated and consequently rotate the friction roll 94. The rotating of the feed cylinder 91 and friction roll 94 in the manner as stated will draw the tape from the spool 78 and through the guide 87. Owing to the rotation of the shaft 51 in the manner as stated, motion will be transmitted to the shaft 52 through the medium of the gear wheel 62 which is carried by the shaft 51 and meshes with the gear wheel 63 frictionally connected with the shaft 52. Rotation of the latter will cause the spool 101 to revolve, winding the tape thereon. Any suitable means can be employed for connecting the free end of the tape to the spool 101 prior to the winding of the tape upon the spool.

During the travel of the tape over the feed cylinder 91 it is adapted to have a record inscribed thereon, such record being the duration of the stoppage of the vessel, or of an order to an engineer and the engineer's answer to said order, also whether said answer is correct or not. The record furthermore will indicate the time the order is given, the time the answer is made and any delay between the order and the response thereto. For this purpose a marker mechanism is employed whereby a permanent as well as a visible record will be made upon the tape. By way of example, the marker mechanism is illustrated to perform a function of recording an order to an engineer and the engineer's answer but it is evident that the marker mechanism could be employed to indicate the operation of the throttle valve as well as the two other records referred to. Such arrangement could be had by the addition of another marker, or in lieu of utilizing what is termed the answer marker, such answer marker could be employed in connection to indicate the manner in which the throttle valve was operated so that a record would be made of how the engineer operated the throttle valve. The marker mechanism by way of example is shown as consisting of a pair of markers 123 and 124, each of these markers is shown by way of example as a fountain pen but any other suitable means can be employed. The marker 123 is termed the order marker and the marker 124 the answer marker. These markers when shifted operate transversely with respect to the record tape 64 but when stationary operate longitudinally with respect to the tape 64. The markers 123, 124 are positioned one behind the other at a predetermined distance, one-half minute apart and the records made thereby when an order is given and a prompt response is made will be such that the two lines made by the markers are a half minute apart without any break in the lines, but if the answer marker should not be operated within the necessary period, that is an immediate response, the line made by the answer marker will be at a point upon the tape which will indicate a greater period of time than a half minute between the two records or lines made by the markers. The marker 123 is secured in a sleeve 125 on the outer end of a carrier arm 126 which is pivoted as at 127 to a reciprocatory carriage 128 slidably mounted upon a track rail 129 which is secured to the tops of the plates 36 and 37. The marker 123 is detachably secured to the sleeve 125 by the holding screw 130. The arm 126 is supported upon the carriage 128 by the keeper 131. Pivoted to the forward end of a link 131ª as at 132 is one arm 133 of a bell crank lever, the latter being pivoted as at 134 to a vertically extending stud 135 secured to the plate 36. The other arm of the bell crank lever is indicated by the reference character 136 and extends toward the plate 37 and through an elongated slot 138 in the guide plate 138' which projects above the plate 37. The link 131ª is pivoted at its rear end as at 131ᵇ to the rear end of the carriage. The marker 124 is detachably secured by a holding screw 139 in a sleeve 140 formed on the forward end of a carrier arm 141 which is pivoted as at 142 to a reciprocatory carriage 143 slidably mounted upon a track rail 144 which is secured to the plates 36, 37. The carrier arm 141 is supported upon the carriage 143 by the keeper 145. Pivotally connected as at 146 to a link 146ª is one arm 147 of a bell crank lever which is pivoted as at 148 to a vertically extending lug 149 attached to the plate 36. The other arm of the bell crank lever is indicated by the reference character 150 and extends toward the plate 37 and through a guide slot 151 formed in the plate 138'. The link 146ª is pivotally connected at its rear end as at 146ᵇ to the rear end of the carriage. The slot 151 is arranged above the plane of the slot 138 and to enable the arm 150 of the bell crank to extend through said slot 151, the rear portion of the arm 150 is off-set with respect to the front portion so that the said rear portion will extend above the plane of the front portion. The bell crank levers which are pivotally connected to the carriages 128 and 143 are oscillated on their pivots whereby reciprocatory movement is imparted to the carriages. In this connection, it will be stated that if the arms 136 and 150 of the bell crank levers are shifted away from each other, the carriages will be shifted outwardly whereby the markers will be moved toward the outer edge of the record tape and inscribe a record thereon. If the elongated arms 136 and 150 of the bell crank levers are shifted toward each other, the carriages will be moved inwardly carrying the markers therewith and in a direction toward the inner edge of the record tape. The length of the carrier arms 126 and 141 is such that the normal position of the markers will be in the space 71 which indicates "Stop." The bell crank levers, carriages and carrier arms constitute means for operating the markers.

By way of example the actuating means for the operating means for the markers consists of a pair of reciprocatory rods 152 and 153, the rod 152 being pivotally connected to the frame 136 of the bell crank and the rod 153 being pivotally connected to the arm 150 of the other bell crank. The arm 152 is also pivotally connected to a reciprocatory toothed rack 154 and the arm 153 is also pivotally connected to a reciprocatory toothed rack 155. The rack 154 travels in a guide 156 secured to the support 29 and the teeth of said rack are adapted to be engaged by the teeth 26 of the double sprocket 24 whereby on a rotation of said sprocket wheel 24 motion will be imparted to the rack 154 which in turn will shift the rod 152 and oscillate the bell crank owing to the fact that the rod 152 is connected with the arm 136 of the bell crank. The rack 155 is carried by a guide 157 projecting from the support 24. The teeth of the rack 155 mesh with the teeth 18 of the double sprocket 16 whereby on the rotation of said sprocket wheel 16 motion will be imparted to the rack 155 which in turn will shift the rod 153 and oscillate the other bell crank as the rod 153 is connected to the arm 150 of the said bell crank.

Briefly the operation of the recorder is as follows: Owing to the manner in which the record tape is set up and when the motor mechanism is operated, the tape is gradually drawn from the reel 78 through the guide 87 over the tape feed cylinder 91 engaging the friction roll 94 and winding on the spool 101. If the markers 123, 124 have not been shifted, a record will be made in the space 71 indicating stoppage of the engine, and also as indicated by the reference character 158, Fig. 11. It will be assumed that the officer desires to have the vessel run "¾ speed ahead," the officer will shift his handle to the indication "¾ speed ahead" on dial 1. Such action will shift the pointer 14 on the engineer's dial to the indication upon the dial 2 "¾ speed ahead." This action on the part of the officer will reciprocate the rack 154 and shift the carriage 128 which will cause the marker which is termed the order marker to move to the space 73 to indicate "¾ speed ahead" as indicated by the reference character 159 Fig. 11. If the engineer should immediately upon receipt of the order answer the same, the engineer shifts his handle to the indication "¾ speed ahead" on the dial 2 which will cause the shifting of the pointer 12 upon the dial 1 to the indication "¾ speed ahead." Such action on the part of the engineer will shift the rack 155 owing to the connection between the rack 155 and the carriage 145, the latter will be shifted causing the marker 124 to shift to the space 73 which indicated "¾ speed ahead" and as indicated by the reference character 160, Fig. 11. It will be assumed that the vessel is moving for a period of 12 minutes at "¾ speed ahead." This record will be made upon the tape and which is indicated by the reference character 161, Fig. 11. Now it will be assumed that the officer desires to have the ship "¾ speed astern," he shifts his handle from "¾ speed ahead" to "¾ speed astern" or "Back" which will shift the pointer 14 upon the engineer's dial to "¾ speed astern" and such action will shift the carriage backwardly carrying the marker 123 therewith and inscribing a record upon the tape 64 as indicated by the reference character 162. The engineer responding to the order will shift his handle from "¾ speed ahead" to "¾ speed astern," which will cause the shifting of the pointer 12 upon the dial 1 to the indication "¾ speed astern," such action will shift the marker carrier 124 inwardly causing a record upon the tape 64 and as indicated by the reference character 163. The two markers 123, 124 will then be indicated upon the space 68 upon the record tape the order "¾ speed astern" and also the time upon which the order was given as will be evident. It is thought unnecessary to describe any further operation as to the manner of making the record.

What we claim is:

1. The combination with a ship's telegraph, of recording mechanisms for indicating on a record tape an order, the time the order was given, the response to the order and the time of the response, means operated by the said ship's telegraph when the navigating officer is sending the order for throwing into operation one of said recording mechanisms to indicate the order and the time when given, and means operated by the ship's telegraph when the engineer is sending his response to the order for throwing into operation the other of said recording mechanisms to indicate the response and the time when given.

2. The combination with a ship's telegraph, of recording mechanisms for indicating on a record tape an order, the time the order was given, the response to the order and the time of the response, means operated directly by the ship's telegraph when the navigating officer is sending the order for throwing into operation one of said recording mechanisms to indicate the order and the time when given, and means operated directly by the ship's telegraph when the engineer is sending his response to the order for throwing into operation the other of said recording mechanisms to indicate the response and the time when given.

3. The combination with a ship's telegraph, of a pair of recording markers for indicating on a record tape an order, the time the order was given, the response to the order and the time of the response, means operated by the ship's telegraph when the navigating officer is sending the order for throwing into operation one of said recording markers to indicate the order and the time when given, and means operated by the ship's telegraph when the engineer is sending his response to the order for throwing into operation the other of said recording markers to indicate the response and the time when given.

4. In combination, a ship's telegraph adapted to be operated by a navigating officer and an engineer, duplex recording markers for indicating respectively on a record tape an order, the time the order was given, a response to the order and the time of the response, means for directly connecting one of said recording markers with the telegraph whereby when a navigating officer is sending an order said marker will be thrown into operation to indicate the order and the time when given, and means for directly connecting the other of the recording markers with the ship's telegraph whereby when the engineer is sending his response to the order the other of said markers will be thrown into operation to indicate the response and the time when given.

5. The combination with a ship's telegraph, of recording mechanisms for indicating on a record tape an order, the time the order was given, the response to the order and the time of the response, means operated by the said ship's telegraph when the navigating officer is sending the order for throwing into operation one of said recording mechanisms to indicate the order and the time when given, means operated by the ship's telegraph when the engineer is sending his response to the order for throwing into operation the other of said recording mechanisms to indicate the response and the time when given, and a record tape shifting and carrying means continuously operating at a pre-determined rate of speed.

6. The combination with a ship's telegraph, of recording mechanisms for indicating on a record tape an order, the time the order was given, the response to the order and the time of the response, means operated directly by the ship's telegraph when the navigating officer is sending the order for throwing into operation one of said recording mechanisms to indicate the order and the time when given, means operated directly by the ship's telegraph when the engineer is sending his response to the order for throwing into operation the other of said recording mechanisms to indicate the response and the time when given, and a record tape shifting and carrying means continuously operating at a pre-determined rate of speed.

7. The combination with a ship's telegraph, of a pair of recording markers for indicating on a record tape an order, the time the order was given, the response to the order and the time of the response, means operated by the ship's telegraph when the navigating officer is sending the order for throwing into operation one of said recording markers to indicate the order and the time when given, means operated by the ship's telegraph when the engineer is sending his response to the order for throwing into operation the other of said recording markers to indicate the response and the time when given, and a record tape shifting and carrying means continuously operating at a pre-determined rate of speed.

8. In combination, a ship's telegraph adapted to be operated by a navigating officer and an engineer, duplex recording markers for indicating respectively on a record tape an order, the time the order was given, a response to the order and the time of the response, means for directly connecting one of said recording markers with the telegraph whereby when a navigating officer is sending an order said marker will be thrown into operation to indicate the order and the time when given, means for directly connecting the other of the recording markers with the ship's telegraph whereby when the engineer is sending his response to the order the other of said markers will be thrown into operation to indicate the response and the time when given, and a record tape shifting and carrying means continuously operating at a pre-determined rate of speed.

9. A ship's telegraph recorder comprising a record tape feed cylinder, a drive shaft therefor, a flexible diaphragm connecting the cylinder to the shaft, and a marker arranged in operative relation with respect to the cylinder.

10. A ship's telegraph recorder comprising a record tape feed cylinder, a drive shaft therefor, a flexible diaphragm connecting the cylinder to the shaft, a marker arranged in operative relation with respect to the cylinder, a tape reel arranged in operative relation with respect to said cylinder, and a rotatable tape spool for receiving the tape from the cylinder.

11. A ship's telegraph recorder comprising a record tape feed cylinder, a drive shaft therefor, a flexible diaphragm connecting the cylinder to the shaft, a marker arranged in operative relation with respect to the cylinder, a tape reel arranged in operative relation with respect to said cylinder, a rotatable tape spool for receiving the tape from the cylinder, and a friction roll interposed between the tape cylinder and the tape spool.

12. A ship's telegraph recorder comprising a record tape feed cylinder, a drive shaft therefor, a flexible diaphragm connecting the cylinder to the shaft, a marker arranged in operative relation with respect to the cylinder, a tape reel arranged in operative relation with respect to said cylinder, a rotatable tape feed spool for receiving the tape from the cylinder, and means frictionally connected with the tape spool for operating it.

13. A ship's telegraph recorder comprising a record tape feed cylinder, a drive shaft therefor, a flexible diaphragm connecting the cylinder to the shaft, a marker arranged in operative relation with respect to the cylinder, a tape reel arranged in operative relation with respect to said cylinder, a rotatable tape feed spool for receiving the tape from the cylinder, and a tape guide interposed between the tape cylinder and the tape reel.

14. In a ship's telegraph recorder, a resiliently supported tape feed cylinder operating at a pre-determined rate of speed, an adjustable friction roll arranged in operative relation with respect to the cylinder and operating at a pre-determined rate of speed, a tape receiving spool arranged in operative relation with respect to the cylinder, a rotatable shaft, a latch for detachably connecting the spool to the shaft, an operating means for the shaft frictionally connected thereto whereby the shaft is capable of being rotated independently of its operating means, a tape reel arranged in operative relation with respect to said cylinder, a spring holding member positioned with relation to said spool and said reel, and an inclined guide interposed between the cylinder and the tape reel.

15. In a ship's telegraph recorder, a resiliently supported tape feed cylinder operating at a pre-determined rate of speed, an adjustable friction roll arranged in operative relation with respect to the cylinder and operating at a pre-determined rate of speed, a tape receiving spool arranged in operative relation with respect to the cylinder, a rotatable shaft, a latch for detachably connecting the spool to the shaft, an operating means for the shaft frictionally connected thereto whereby the shaft is capable of being rotated independently of its operating means, a tape reel arranged in operative relation with respect to said cylinder, a spring holding member positioned with relation to said spool and said reel, an inclined guide interposed between the cylinder and the tape reel, and a plurality of reciprocatory markers arranged in operative relation with respect to the tape upon said cylinder.

16. In a ship's telegraph recorder, a resiliently supported tape feed cylinder operating at a pre-determined rate of speed, an adjustable friction roll arranged in operative relation with respect to the cylinder and operating at a pre-determined rate of speed, a tape receiving spool arranged in operative relation with respect to the cylinder, a rotatable shaft, a latch for detachably connecting the spool to the shaft, an operating means for the shaft frictionally connected thereto whereby the shaft is capable of being rotated independently of its operating means, a tape reel arranged in operative relation with respect to said cylinder, a spring holding member positioned with relation to said spool and said reel, an inclined guide interposed between the cylinder and the tape reel, a plurality of reciprocatory markers arranged in operative relation with respect to the tape upon said cylinder, a ship's telegraph and means actuated from the ship's telegraph for operating said markers.

17. In combination, means for shifting a record surface at a pre-determined rate of speed, a plurality of reciprocating markers arranged in operative relation with respect to the record surface and adapted when actuated to inscribe records upon said surface, a carrier arm for each of the markers, a reciprocatory carriage attached to each of the carrier arms, a ship's telegraph, and an operative connection between the telegraph and one of said carriages for operating the latter when sending an order, and an operative connection between the other of said carriages and the ship's telegraph for operating said last mentioned carriage when sending a response to the order.

18. In combination, means for shifting a record surface at a pre-determined rate of speed, a plurality of reciprocating markers arranged in operative relation with respect to the record surface and adapted when actuated to inscribe records upon said surface, a carrier arm for each of the markers, a reciprocatory carriage attached to each of the carrier arms, a ship's telegraph and means actuated from said telegraph for independently operating said carriages.

19. In a ship recorder, means for shifting a record surface at a pre-determined rate of speed, a plurality of reciprocatory markers arranged in operative relation with respect to the recorder surface and adapted when actuated to indicate upon said surface an order, the time the order was given, a response, the time the response was sent, a carrier arm for each of the markers, a reciprocatory carriage attached to each of the carrier arms, bell crank levers for shifting said carriages, and means for independently operating each of said bell cranks whereby each of said markers is operated independently with respect to each other.

20. In a ship's telegraph recorder, means operated from a ship's telegraph when sending an order, whereby an order and time of the order are simultaneously printed upon a record tape, and means operated from a ship's telegraph when responding to an order whereby a response and the time of the response are simultaneously printed upon the record tape.

21. In a ship's telegraph recorder, means whereby an order and time of the order are simultaneously printed upon a record tape, and means whereby a response and the time of the response are simultaneously printed upon the record tape, combined with a ship's telegraph for successively shifting each of said means to a position for printing upon the tape.

In testimony whereof we affix our signatures in the presence of two witnesses.

HARRY WILSON.
OSCAR R. OEHMLER.

Witnesses:
HARLAN C. ALLEN,
N. LOUIS BOGAN.